US008731884B2

(12) United States Patent
Jones et al.

(10) Patent No.: US 8,731,884 B2
(45) Date of Patent: May 20, 2014

(54) SCINTILLATION GENERATOR FOR SIMULATION OF AERO-OPTICAL AND ATMOSPHERIC TURBULENCE

(75) Inventors: Michael I. Jones, Azle, TX (US); Christopher J. Iannello, Fort Worth, TX (US); Guy L. Love, Keller, TX (US); Gary J. Baker, Los Altos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 388 days.

(21) Appl. No.: 13/165,773

(22) Filed: Jun. 21, 2011

(65) Prior Publication Data

US 2012/0330633 A1 Dec. 27, 2012

(51) Int. Cl.
 *G06G 7/48* (2006.01)
(52) U.S. Cl.
 USPC .............................................. 703/6
(58) Field of Classification Search
 USPC .............................................. 703/6
 See application file for complete search history.

(56) References Cited

U.S. PATENT DOCUMENTS

| | | | |
|---|---|---|---|
| 5,396,482 A * | 3/1995 | Lehureau | 369/103 |
| 6,721,510 B2 | 4/2004 | Graves et al. | |
| 6,884,962 B2 * | 4/2005 | Lizotte | 219/121.73 |
| 7,397,018 B1 | 7/2008 | Pham et al. | |
| 7,406,263 B2 | 7/2008 | Graves et al. | |
| 7,457,545 B2 | 11/2008 | Wirth et al. | |
| 7,656,539 B1 | 2/2010 | Lee | |
| 7,689,127 B1 | 3/2010 | Beffa | |
| 2003/0001073 A1 | 1/2003 | Presby et al. | |
| 2003/0067657 A1 | 4/2003 | Dimmler et al. | |
| 2004/0141752 A1 * | 7/2004 | Shelton et al. | 398/120 |
| 2004/0179252 A1 * | 9/2004 | Tsukagoshi | 359/3 |
| 2007/0223929 A1 * | 9/2007 | Graves | 398/122 |
| 2010/0232007 A1 | 9/2010 | Byren et al. | |

FOREIGN PATENT DOCUMENTS

WO   WO 2009/120847   10/2009

OTHER PUBLICATIONS

Nahrstedt et al.: Wind tunnel validation of computational fluid dynamics-based aero-optics model; Proc. IMechE vol. 223 Part G: J. Aerospace Engineering; pp. 393-406; 2009.*
Kuan, et al., "Simulation of full field correction with two-deformable-mirror adaptive optics", High Power Laser and Particle Beams, Nov. 2000, vol. 12, pp. 665-669.

(Continued)

*Primary Examiner* — Hugh Jones
(74) *Attorney, Agent, or Firm* — McDermott Will & Emery LLP

(57) ABSTRACT

In one aspect, a scintillation generator for simulation of aero-optical and atmospheric turbulence is described. A first deformable mirror is illuminated using collimated light from a source laser beam. In one aspect, movement of a first deformable mirror is controlled to modulate a reflected laser beam to induce wave-front phase errors onto the reflected laser beam to simulate propagation of the reflected laser beam through near-field aero-optical disturbance. In one aspect, the reflected laser beam is focused onto a second deformable mirror to form a near-field beam. In one aspect, movement of the second deformable mirror is controlled to modulate a reflection of the near-field laser beam to induce amplitude fluctuations onto the reflected near-field laser beam to simulate propagation of the reflected near-field laser beam through far-field atmospheric turbulence. The second deformable mirror is in a Fourier plane of the first deformable mirror. Other aspects are described and claimed.

19 Claims, 10 Drawing Sheets

(56) References Cited

OTHER PUBLICATIONS

Hao, et al., "Experiment of full field compensation with two-deformable mirrors adaptive optics system", Infrared Laser Engineering, Aug. 2011, vol. 40, pp. 1542-1546.

Barchers, "Evaluation of the impact of finite-resolution effects on scintillation compensation using two deformable mirrors", J. Opt. Soc. Am. A. Dec. 2001, pp. 3098-3109, vol. 18, No. 12.

Barchers, "Application of the parallel generalized projection algorithm to the control of two finite-resolution deformable mirrors for scintillation compensation", J. Opt. Soc. Am. A, Jan. 2002, pp. 54-63, vol. 19, No. 1.

Barchers, "Closed-loop stable control of two deformable mirrors for compensation of amplitude and phase fluctuations", J. Opt. Soc. Am. A., May 2002, pp. 926-945, vol. 19, No. 5.

Berkefeld et al., "Multi-Conjugate Adaptive Optics With Two Deformable Mirrors—Requirements and Performance", Experimental Astronomy, 2001, pp. 1-21, vol. 11.

Plourde, "Limitations of Segmented Wavefront Control Devices in Emulating Optical Turbulence", Department of the Air Force Air University, Air Force Institute of Technology, Mar. 2008, Wright-Patterson Air Force Base, Ohio, 111 pp.

Roggemann et al., "Two-deformable-mirror concept for correcting scintillation effects in laser beam projection through the turbulent atmosphere", Applied Optics, Jul. 20, 1998, pp. 4577-4585, vol. 37, No. 21.

Zhai et al., "Improvement of Transmitting Laser Beam Quality by Using Two Deformable Mirrors", IEEE, 2009, 3 pp.

Zhang, "Compensation of Laser Beam Projection Through Strong Turbulence With a Multi-Mirror Adaptive Optics System", Michigan Technological University, 2006, 127 pp.

\* cited by examiner

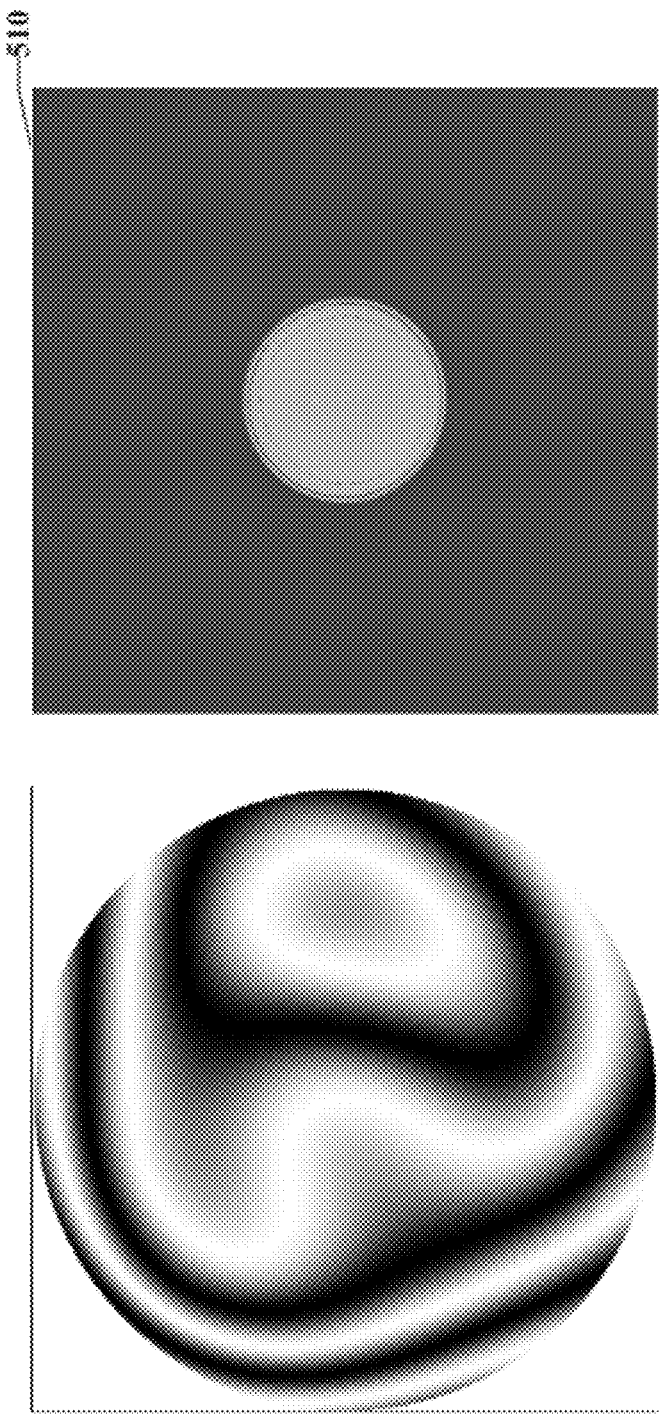

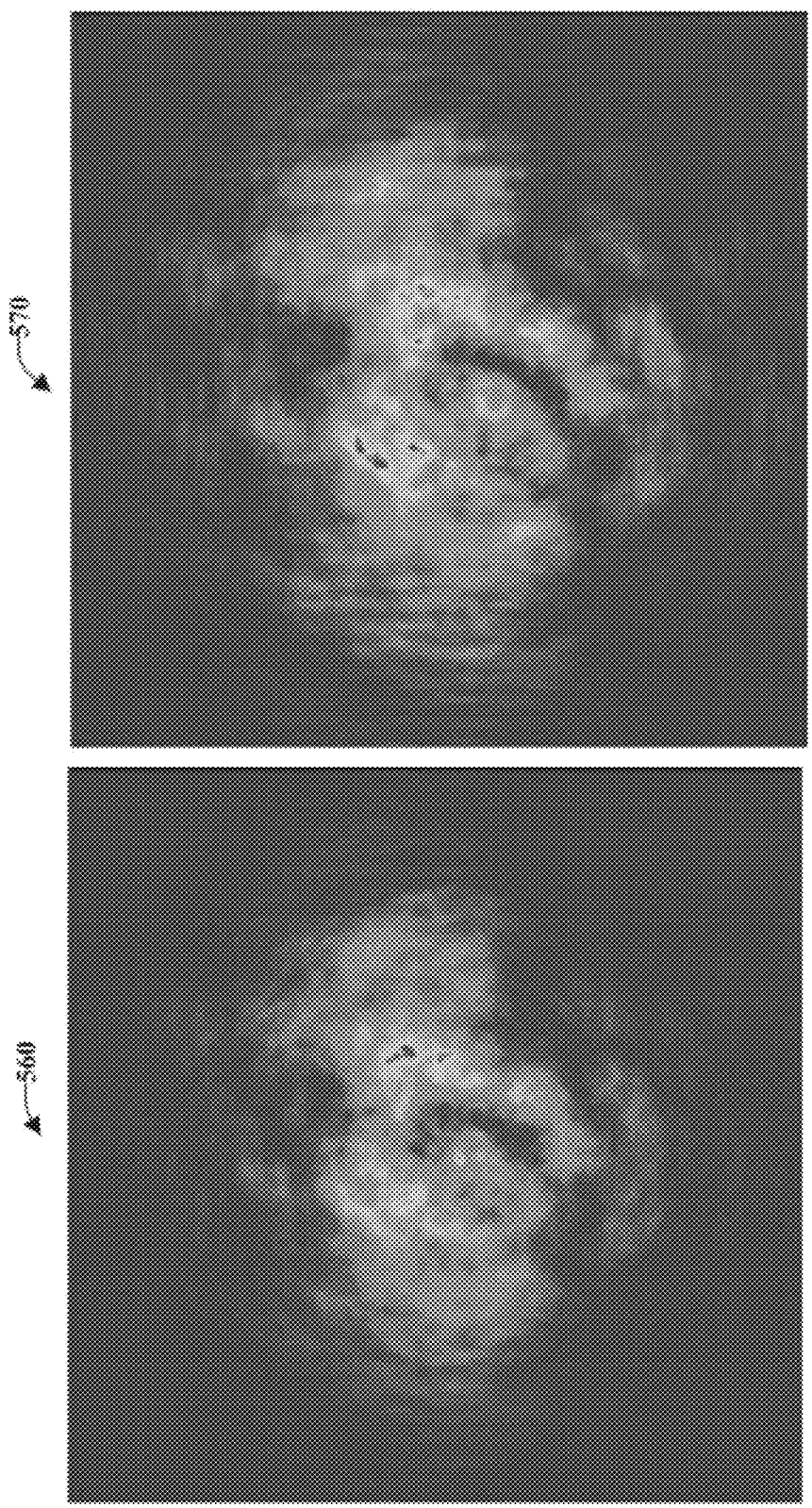

SCINTILLATION GENERATOR FOR SIMULATION OF AERO-OPTICAL AND ATMOSPHERIC TURBULENCE

FIELD

An aspect of the present disclosure relates to the field of laser optics, and more particularly, to a scintillation generator for simulation of aero-optical and atmospheric turbulence.

BACKGROUND

Adaptive optics (AO) is a technology for reducing the effect of wave-front distortions for improving the performance of optical systems. AO systems may be used to remove the effects of atmospheric distortion or optical aberrations in laser communication systems, astronomical telescopes, and retinal imaging systems. AO systems operate by measuring and compensating for distortions in a wave-front using a spatial phase modulator, such as a deformable mirror or a liquid crystal array.

Propagation of laser energy and sensor imagery is degraded by the optical effects of atmospheric path turbulence arising from both a near-field aerodynamic flow-field and free-stream atmospheric turbulence beyond the aerodynamic flow regime. AO systems in use since the 1970's attempt to reduce the effects of these two turbulence regimes on propagating optical signals; however, limitations of AO system closed-loop bandwidth and spatial resolution hamper the ability of AO systems to fully correct for path turbulence. Hence, optimization and refinement of AO systems is actively ongoing.

New developments in ultra-high speed laser communication have pushed data rates to 100 giga-bits per second (Gb/sec) or higher, yet these laser communication systems are not immune to aerodynamic and free-stream turbulence, and are subject to frequent and rapid data fades and dropouts in strong scintillation (variation in amplitude at the laser-communication optical entrance pupil). For example, laser radar (LADAR) systems rely on strong target backscatter signals for accurate range and Doppler information, and these backscatter signals are again modulated in intensity by time-varying scintillation, thereby decreasing system performance.

SUMMARY

In one aspect of the subject disclosure, the role of a two-deformable mirror (2-DM) system is reversed to create realistic turbulence and scintillation for testing and development purposes. In one aspect, the use of two deformable mirrors (DM) in a scintillation generator provides a wide variety of laser and electro-optical systems for reliable, calibrated, validated optical simulation of aerodynamic and free-stream turbulence at realistic ranges and conditions, but within an optical laboratory environment. The application of a second DM in a Fourier plane of a first DM, according to one embodiment, enables simulation of amplitude fluctuations in the far field, thus providing a means for accurately simulating realistic propagation of beams through both aerodynamic flow-fields and through free-stream paths outside the immediate flow-field. In one aspect, a scintillation generator may be easily reconfigured to any laser wavelength by changing appropriate optical lens elements. In one aspect, a scintillation generator creates programmable simulations. A scintillation generator, according to one aspect, should increase in value and utility over time and across many programs, as the input files to drive the system for a specific case are added to its broader and more general data library.

In one aspect of the subject disclosure, a scintillation generator for simulation of aero-optical and atmospheric turbulence is described. In one aspect, a first deformable mirror is illuminated using collimated light from a source laser beam. In one aspect movement (actuation) of a first deformable mirror is controlled to modulate a reflected laser beam to induce wave-front phase error (aberrations) onto a reflected laser beam to simulate propagation of the reflected laser beam through near-field aero-optical disturbance. In one aspect, the reflected laser beam is focused onto a second deformable mirror to form a near-field beam. In one aspect, movement (actuation) of the second deformable mirror is controlled to modulate a reflection of the near-field laser beam to induce amplitude fluctuations onto the reflected near-field laser beam to simulate propagation of the reflected near-field laser beam through far-field atmospheric turbulence. In one aspect, the second deformable mirror is in a Fourier plane of the first deformable mirror. Other aspects are described and claimed.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 7 is a diagram illustrating wave-front error generated by a first deformable mirror according to one aspect of the subject disclosure.

FIG. 8 is a diagram illustrating an irradiance plot of a laser beam generated by a second deformable mirror without actuation according to one aspect of the subject disclosure.

FIGS. 9A-9F are diagrams illustrating an irradiance plots of laser beams generated by a second deformable mirror with increased actuation according to one aspect of the subject disclosure.

DETAILED DESCRIPTION

Figure 1:
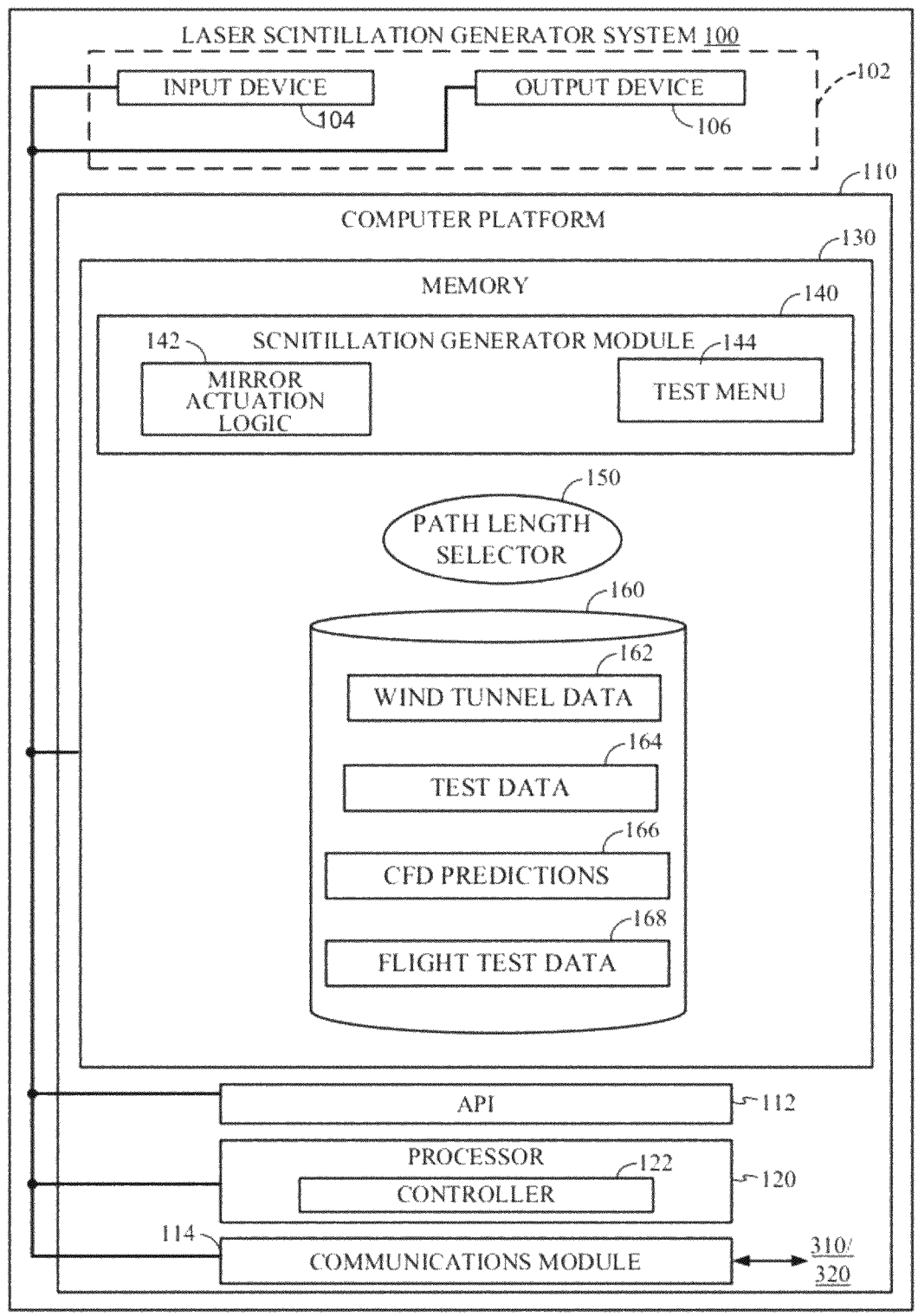
FIG. 1 is a conceptual block diagram illustrating an example of a laser scintillation generation system according to one aspect of the subject disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Some aspects of the subject disclosure, address a need in technology development for a wide variety of laser and electro-optical systems for reliable, calibrated, validated optical simulation of aerodynamic and free-stream turbulence in a laboratory setting. Conventionally, it has been necessary to setup laser-based sensors and systems on mountaintops, towers and/or building tops (as far apart as practical) to test performance at range, typically followed by very costly flight testing. This open-air testing introduces random, uncontrollable unrepeatability into the test data, as well as tower or building vibration and local thermal effects. Flight testing adds several layers of unrepeatability to the testing. In addition, both methods are highly susceptible to weather conditions, and are complicated by requiring lengthy and stringent approvals by the Federal Aviation Administration (FAA) for laser operation, often accompanied by restricted operation times.

Some aspects of the present disclosure eliminate the need for long-range testing during development of laser and electro-optical systems. In one aspect, single-DM modulation of collimated beams is used to vary the wave-front phase error in the beam. The application of the second DM in the Fourier plane of the first DM, as embodied in one aspect of the present disclosure, enables simulation of amplitude fluctuations in the far field, thus providing a means for accurately simulating realistic propagation of beams through both aerodynamic flow-fields and through free-stream paths outside the immediate flow-field. Inclusion of a variable-density neutral filter may allow simulation of path absorption by the atmosphere. Optional inclusion of weak holographic diffusers in the path simulates atmospheric scattering and radiance. This combination of components may provide a direct, easily calibrated, easily validated method for accurate simulation of long-path propagation, but within the controlled environment of an optical laboratory.

In one aspect, the scintillation generator may be easily reconfigured to any laser wavelength by changing appropriate optical lens elements. In one aspect, a scintillation generator creates programmable simulations. A scintillation generator, according to one aspect, should increase in value and utility over time across many programs, as the input files to drive the system for a specific case are added to its broader and more general data library.

One aspect of the present disclosure allows precise simulation of long-path turbulence and scintillation within the controlled environment of an optical laboratory with no restrictions other than those imposed by standard laser safety regulations. The deformable mirrors used in one aspect are strictly under computer control, and thus provide accurate, repeatable, calibration and validation of wave-front modulation of any desired temporal and spatial behavior, and at any level of intensity. This provides a direct means and method for testing the performance of laser and electro-optical systems at realistic ranges and conditions, but within the optical laboratory environment.

In one aspect, two deformable mirrors (DM) are used in this scintillation generator. In one aspect, a first DM is fed collimated light and is used to generate time-varying optical wave-front phase errors that simulate the temporal and spatial behavior of realistic aerodynamic and atmospheric turbulence. Light reflects from this first DM to a focusing mirror and is brought to the mirror focal point, which may be the Fourier plane for the first DM. In one aspect, a second DM is positioned at this focal point, and its surface profile is driven to simulate realistic spatial and temporal amplitude fluctuations in the beam, characterized by the beam Rytov number, coherency length ($r_0$), anisoplanatic patch size, scintillation variance and other metrics.

In one aspect, a third mirror may re-collimate the beam, which is then optionally passed through a variable neutral density filter to simulate path absorption, then optionally through weak holographic diffusers to simulate path scattering and radiance, then into a zoom lens that brings the beam to the focal point of a larger test collimator. The zoom lens focal ratio may be varied to change the average diameter of the beam projected from a collimator. In one aspect, the scintillation generator is fully programmable through standard adaptive optics techniques and is able to duplicate any desired level of aero-optical and atmospheric turbulence and transmission at any desired, simulated test range.

As described herein, the term "near field" may refer to an immediate flow-field surrounding and affecting a vehicle. As further described herein, the term "far field" may refer to aerodynamic flow-fields and free-stream paths outside the immediate flow-field surrounding a vehicle. As further described herein, the term "aero-optic aberration" may refer to time varying phase errors within a near-field of a vehicle. As further described herein, the term "scintillation aberration" may refer to amplitude fluctuations in a far field from a vehicle. The terms "aero-optic aberration" and "scintillation aberration" may refer to wave-front errors (WFE) that may be induced within a laser beam to simulate the temporal and spatial behavior of realistic aerodynamic and atmospheric turbulence.

FIG. 1 illustrates a laser scintillation generation system 100 in accordance with the disclosed aspects. System 100 is operable to access and receive wind tunnel data 162 and to access and receive computational fluid dynamics (CFD) predictions 166, test data 164, and/or flight test data 168 for precise simulation of long-path turbulence and scintillation within the controlled environment of an optical laboratory. System 100 may comprise a computer platform 110 having a memory 130 operable to store data, logic, and applications executable by a processor 120. A user may interact with system 100 and its resident applications through one or more user interfaces 102, which may include one or more input devices 104 and one or more output devices 106. Additionally, system 100 may exchange communications with external devices 310/320 (FIG. 3) and/or networks through a communications module 114.

Computer platform 110 is operable to transmit data across a network, and is operable to receive and execute routines and applications and display data generated within system 100 or received from any network device or other computer device connected to the network or connected to system 100. Computer platform 130 may be embodied in, for example, one or any combination of hardware, firmware, software, data and executable instructions.

Memory 130 may comprise one or any combination of volatile and nonvolatile memory, such as read-only and/or random-access memory (RAM and ROM), EPROM, EEPROM, flash cards, flash memory cells, an electronic file system, and any memory common to computer platforms. Further, memory 130 may include one or more of any secondary or tertiary storage device, such as magnetic media, optical media, tape, or soft or hard disk, including removable memory mechanisms.

Further, processor 120 may be one or more of an application-specific integrated circuit ("ASIC"), a chipset, a processor, a logic circuit, and any other data processing device. In some aspects, processor 120, or another processor such as an ASIC, may execute an application programming interface (API) layer 112 that interfaces with any resident programs stored in memory 130 of system 100. API 112 may be a runtime environment executing on system 100. In one aspect, API 112, in combination with navigation menu 144, may be used for precise simulation of long-path turbulence and scintillation within the controlled environment of an optical laboratory.

Additionally, processor 120 may include controller 122 embodied in hardware, firmware, software, data, executable instructions and combinations thereof, which enable video latency reduction according to one embodiment. For example, controller 122 in combination with mirror actuation logic 142 of scintillation generator module 140 may enable precise simulation of long-path turbulence and scintillation within the controlled environment of an optical laboratory.

Further, communications module 114 may be embodied in hardware, firmware, software, data, executable instructions and combinations thereof, and is operable to enable communications among the various wireless data links. For example, communication module 114 may include the requisite hardware, firmware, software, data, executable instructions and combinations thereof, including transmit and receive chain components for establishing a wireless communication connection.

Further, for example, communication module 114 is operable to receive wind tunnel data 162 or CFD prediction 166 and forwards them to controller 122 or provides controller 122 with access to the data. Similarly, for example, communication module 114 is operable to receive prior test data 164 or flight test data 168 and either forwards them to controller 122 or provides controller 122 with access to the data. Subsequently, for example, communications module 114 is operable to forward test data to other device components for further processing such as path length selector 150 for adjusting an optical path length of the far-field laser beam to achieve a pre-determined far-field pattern at a target, according to one aspect. According to one aspect of the subject disclosure, controller 122 is operable to control actuation of the first and second deformable mirrors (FIG. 3) for precise simulation of long-path turbulence and scintillation within the controlled environment of an optical laboratory.

Referring again to FIG. 1, one or more input devices 104 for generating inputs into system 100, and one or more output devices 106 for generating information for consumption by the user of the system are provided. For example, input device 104 may include a mechanism such as a key or keyboard, a navigation mechanism (e.g. a joy stick), a mouse, a touchscreen display, a microphone in association with a voice recognition module, etc. In certain aspects, input device 104 provides an interface for receiving user input, such as to activate or interact with an application or module on a remote vehicle. Further, for example, output device 102 may include a display, an audio speaker, a haptic feedback mechanism, etc. Further, user interface 102 may comprise one or any combination of input devices 104 and/or output devices 106.

Figure 2:
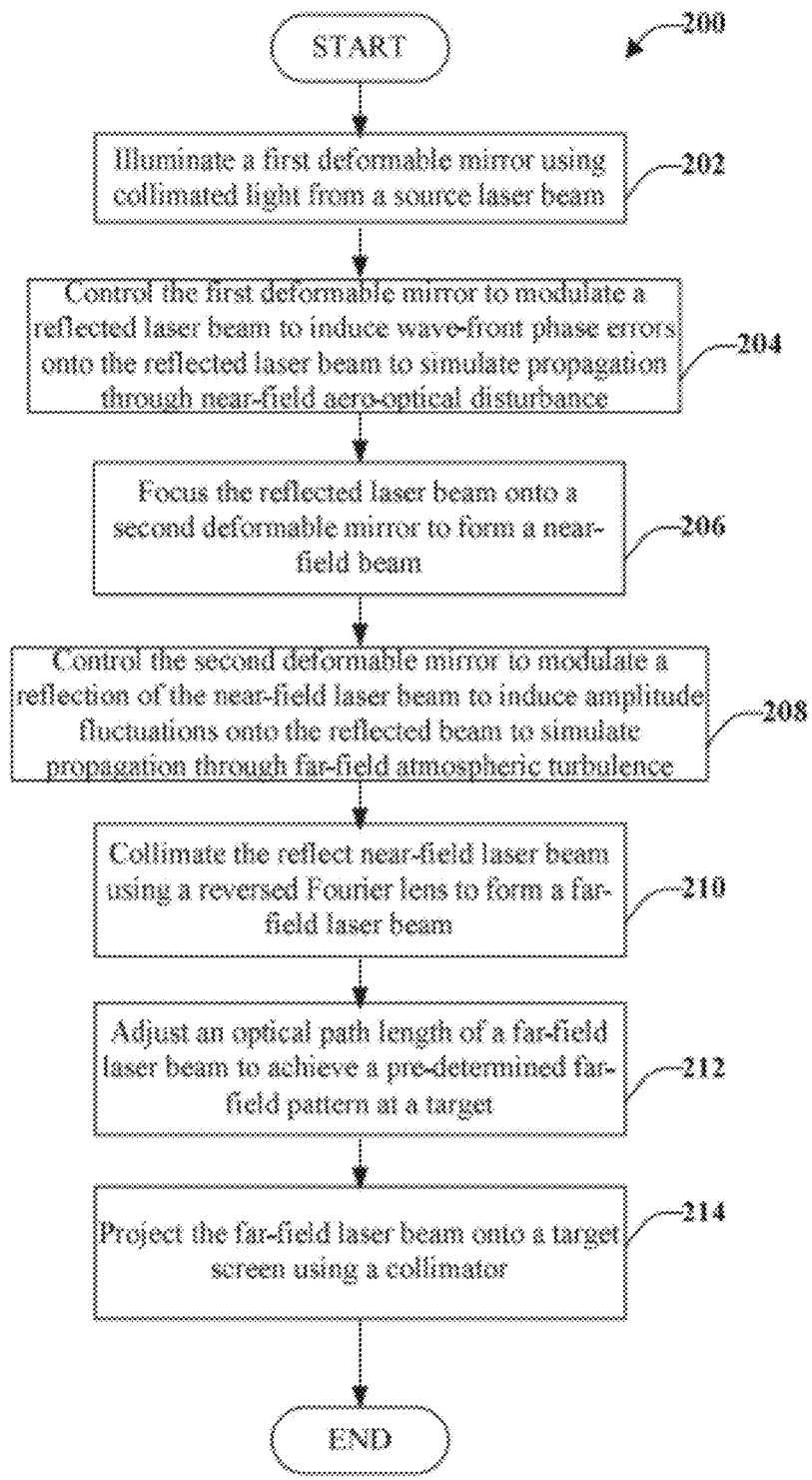
FIG. 2 is a diagram illustrating a flow chart for simulation of aero-optical and atmospheric turbulence according to one aspect of the subject disclosure.

FIG. 2 is a diagram illustrating a flowchart 200 for precise simulation of long-path turbulence and scintillation within the controlled environment of an optical laboratory, according to one aspect of the present disclosure. At process block 202, a first deformable mirror is illuminated using collimated light from a source laser beam. At process block 204, movement (actuation) of the first deformable mirror is controlled to modulate a reflected laser beam to induce wave-front phase errors onto the reflected laser beam to simulate propagation of the reflected laser beam through near-field aero-optical disturbance. At process block 206 the reflected laser beam is focused onto a second deformable mirror to form a near-field beam. At process block 208, movement (actuation) of the second deformable mirror is controlled to modulate a reflection of the near-field laser beam to induce amplitude fluctuations onto the reflected near-field laser beam to simulate propagation of the reflected near-field laser beam through far-field atmospheric turbulence. At process block 210, the far-field laser beam may be collimated using, for example, a reversed Fourier lens 406 (FIG. 6) to form a far-field laser beam.

Referring again to FIG. 2, at process block 212, an optical path length of the far-field laser beam may be adjusted to achieve a pre-determined far-field pattern at a target. In one aspect, an optical path length is determined using fold mirrors 330, as shown in FIGS. 3-6, which may be adjusted along track 332 to achieve a desired optical path length, as described in further detail below. At process block 214 the far-field laser beam may be projected onto a target screen using a collimator 360/460, as shown in FIGS. 3-6.

As described with reference to FIGS. 1-6, the control of the first and second deformable mirrors (DM-1 310/410 and DM-2 320/420 (FIGS. 3-6)) is provided to actuate or move the deformable mirrors to induce phase errors or amplitude errors in reflected signals. In one aspect, controlling the movement of DM-1 310/410 and DM-2 320/420 is performed using, for example, wind tunnel data 162, previous test data 164, CFD predictions 166, or flight test data 168, as described in FIG. 1. In one aspect, sensors or other like instruments may be used to measure turbulence experienced within a wind tunnel. Based on measurements taken with the sensors or other like instruments within the wind tunnel, the measured wind tunnel turbulence may be used to move (actuate) DM-1 310/410 and DM-2 320/420 while illuminated with a laser beam, such that a reflected signal includes induced wave front errors. According to one aspect of the subject disclosure, the wave front errors may refer to phase errors or amplitude errors.

Figure 6:
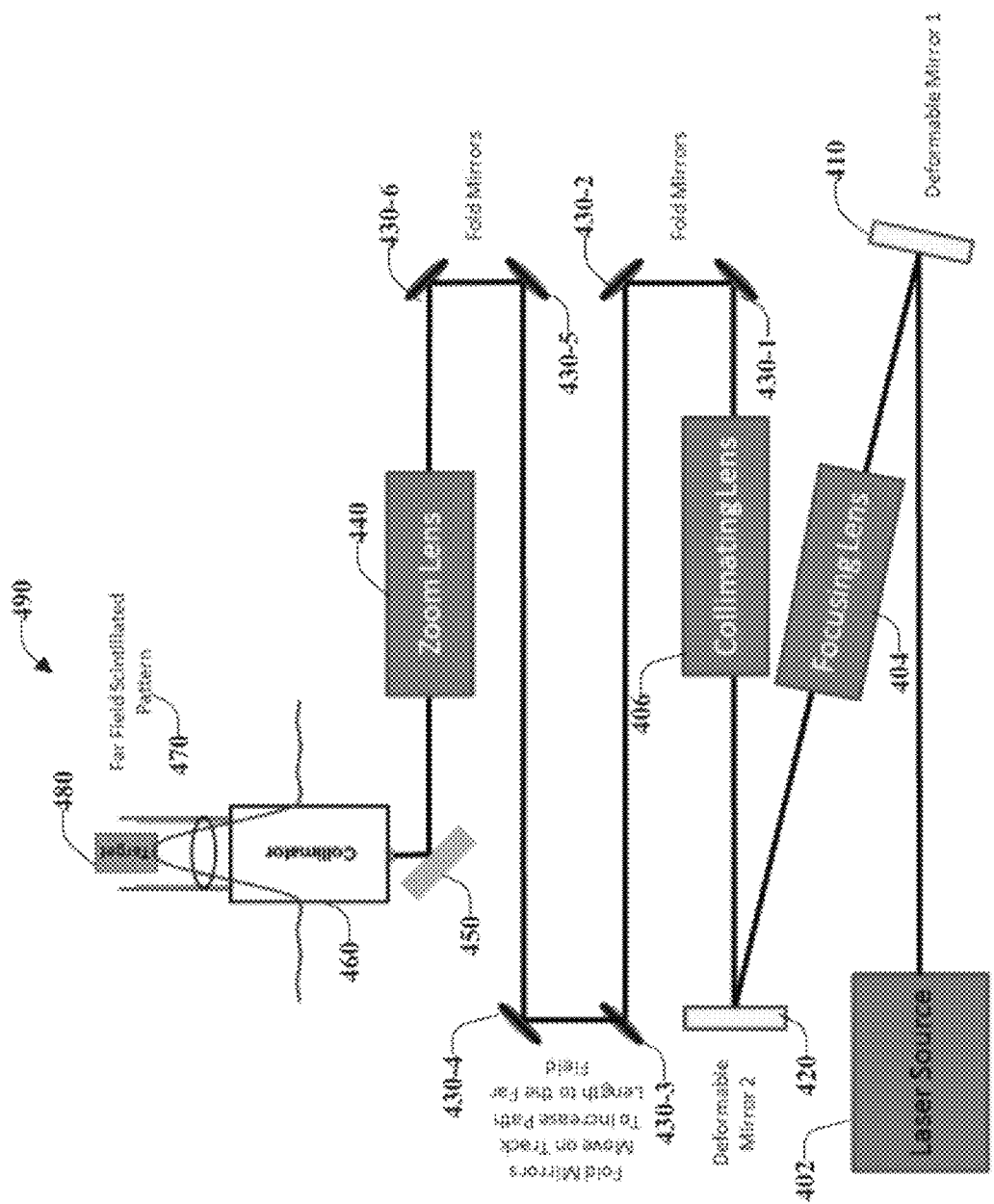
FIG. 6 is a block diagram further illustrating the scintillation generator for simulation of aero-optical and atmospheric turbulence of FIG. 5, according to one aspect of the subject disclosure.
Figure 9B:
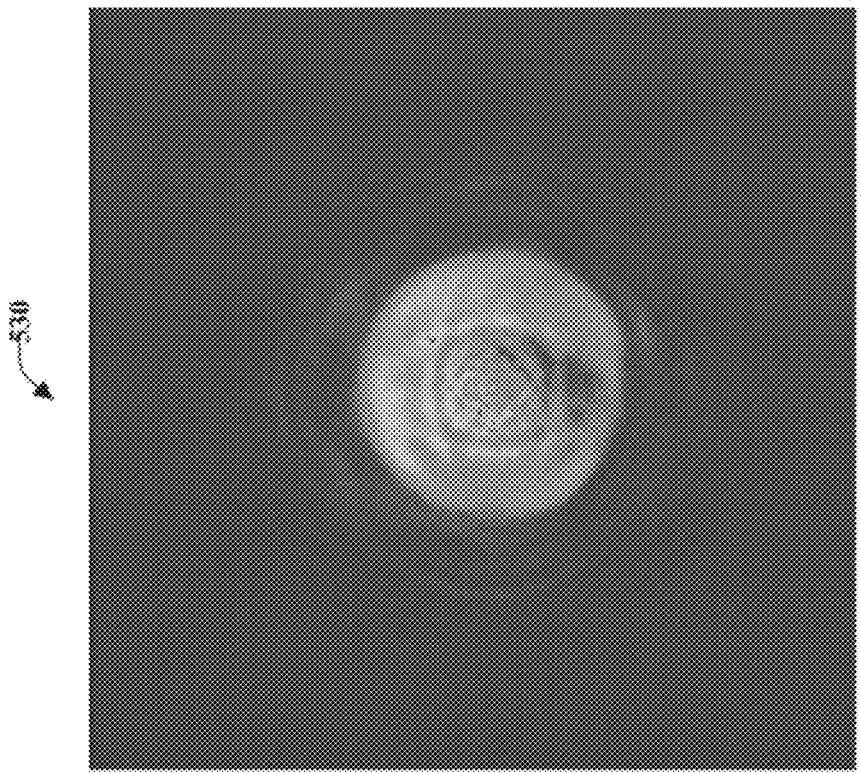
Figure 9A:
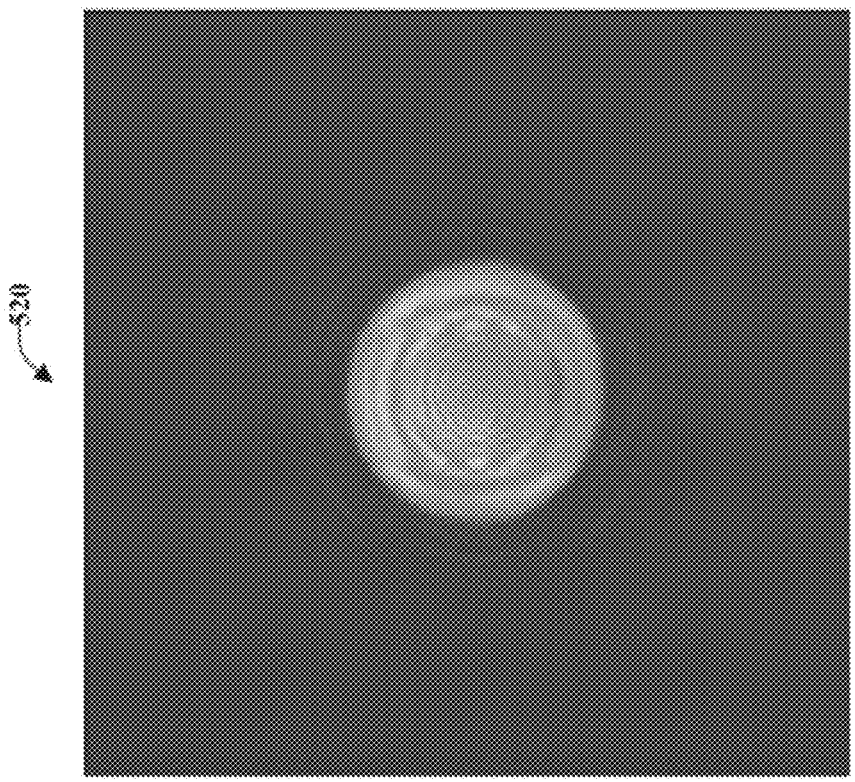
Figure 9C:
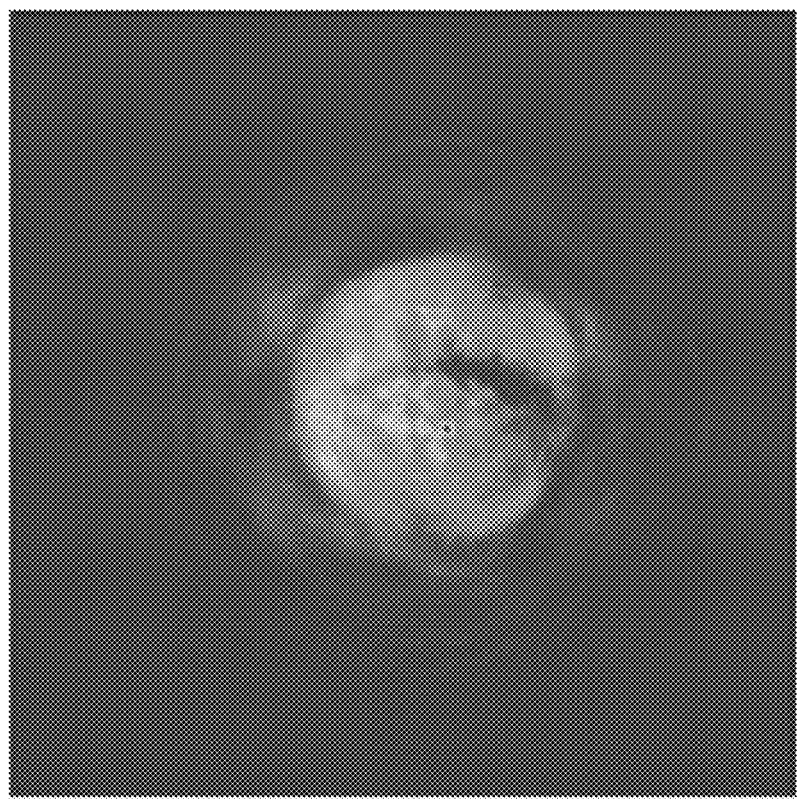
Figure 9D:
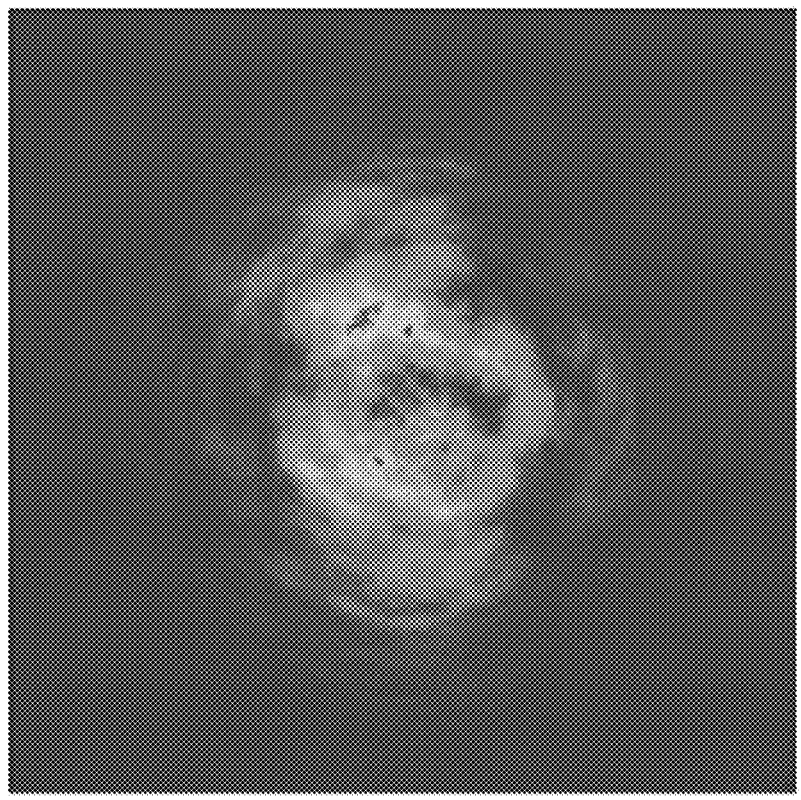

In one aspect, movement of DM-1 310/410 according to, for example, wind tunnel data 162, while illuminated with a laser beam, simulates the propagation of a reflected laser beam through near-field aero-optical disturbance by inducing phase fluctuations in a reflected laser beam. In a further aspect, movement of DM-2 320/420 according to, for example, CFD predictions 166, while illuminated with a near-field laser beam, simulates the propagation of a reflected near-field laser beam through far-field atmospheric turbulence by inducing amplitude fluctuations onto the reflected near-field laser beam. As shown in FIG. 6, the reflected near-field laser beam from DM-2 410 may be passed through collimating lens 406 to form a far-field laser beam. In one aspect, the far-field laser beam includes induced amplitude fluctuations superimposed onto wave-front phase aberrations to simulate propagation of the far-field laser beam through near-field aero-optical disturbance and far-field atmospheric turbulence.

Figure 3:
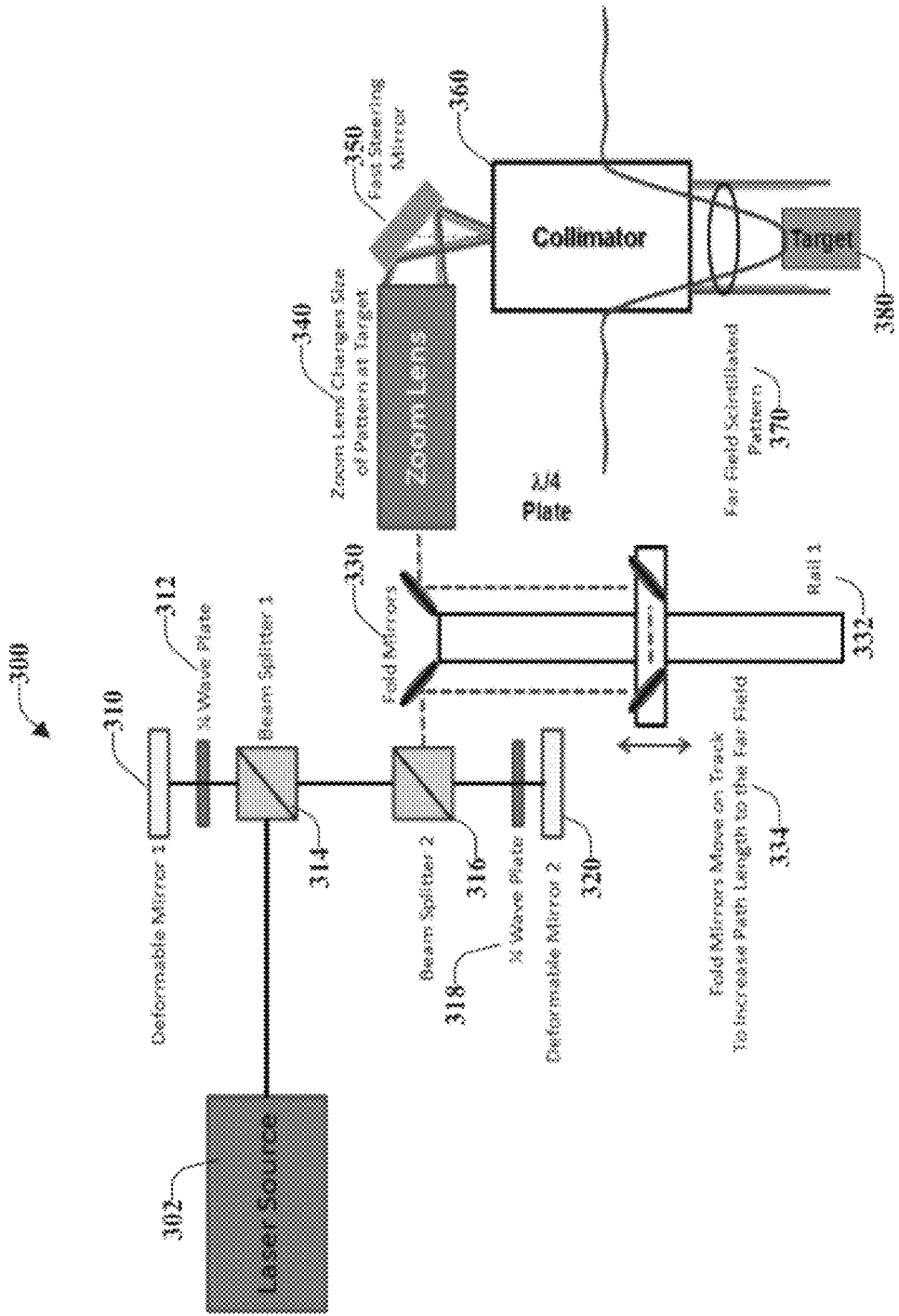
FIG. 3 is a block diagram illustrating a scintillation generator for simulation of aero-optical and atmospheric turbulence according to one aspect of the subject disclosure.
Figure 4:
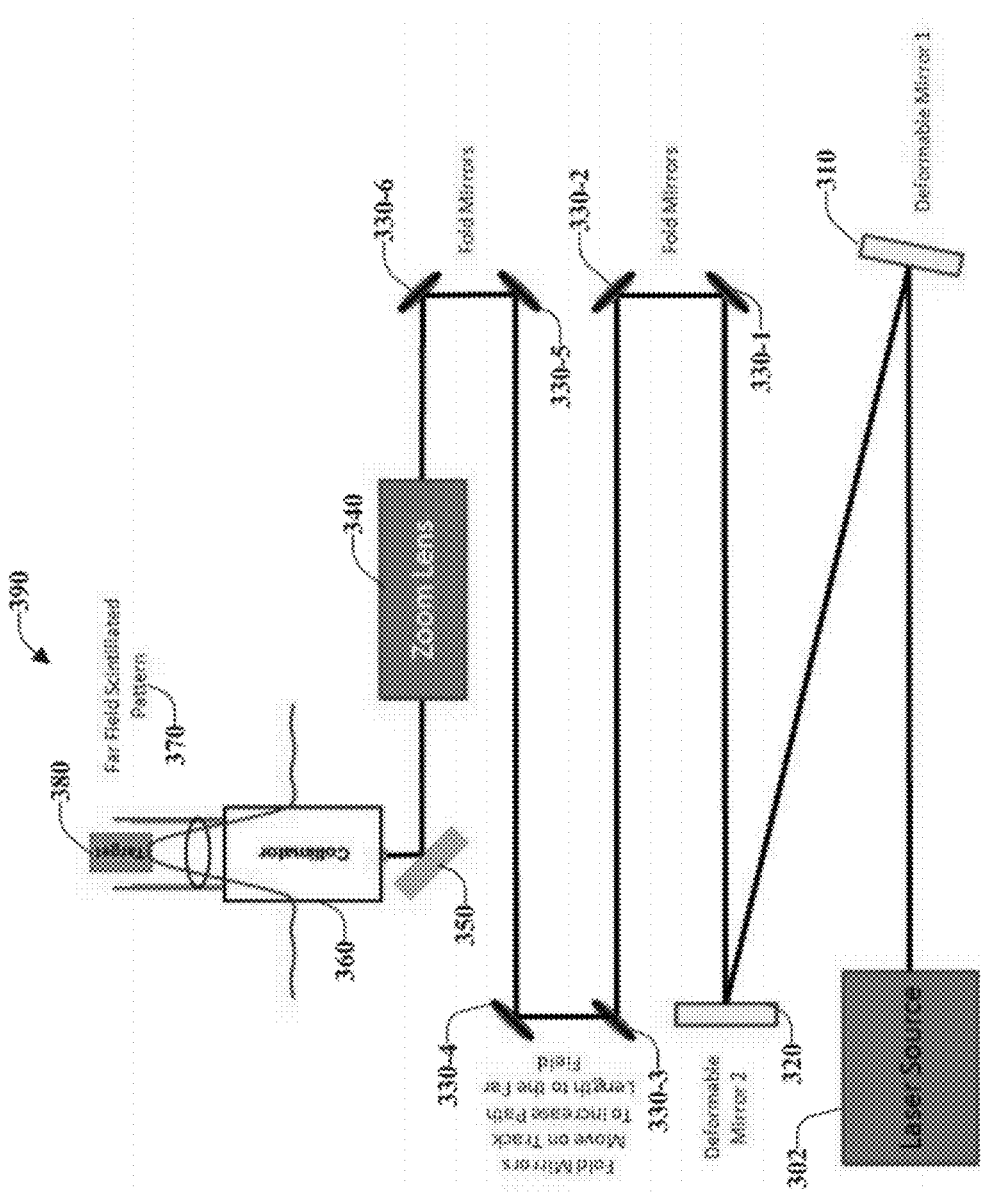
FIG. 4 is a block diagram further illustrating the scintillation generator for simulation of aero-optical and atmospheric turbulence of FIG. 3 according to one aspect of the subject disclosure.

FIG. 3 is a block diagram illustrating a scintillation generator 300 for simulation of aero-optical and atmospheric turbulence according to one aspect of the subject disclosure. Representatively, scintillation generator 300 utilizes a collimated beam through the path from laser source 302. A first deformable mirror (DM-1) 310 and a second deformable mirror (DM-2) 320 are located at the near field of laser source 302. In one aspect, DM-1 310 and DM-2 320 are used in conjunction with one another to introduce wave-front error (WFE) into a laser beam to provide a far field scintillated pattern 370. If, for example, DM-1 310 has more actuator stroke than DM-2 320, the deformable mirror 310 and 320 can be used in a woofer-tweeter configuration in order to replicate a desired WFE. Otherwise, the deformable mirror 310 and 320 can be used to split the workload of replicating the desired WFE.

Representatively, scintillation generator 300 may use first and second polarizing beam splitters (314 and 316) in conjunction with quarter (¼) wave plates (312 and 318) for allowing the incident energy to strike DM-1 310 and DM-2 320 at normal incidence angle. This introduces the least amount of residual WFE replication as there is no tip/tilt to DM-1 310 or DM-2 320 that would cause the beam spot to spread. Some experimental setups, however, cannot use beam splitters, such as scintillation generator 390 of FIG. 4, which is shown without the use of beam splitters 314 and 316. In one aspect, DM-1 310 and DM-2 320 may be tilted to an optical axis by the minimum amount of angle needed for the beam to physically clear other optical elements on the optics bench (for example a nominal 5°).

As further shown in FIG. 3, fold mirrors 330 (330-1 to 330-6 FIG. 4) are used on order to increase the optical path length in order to achieve a far-field pattern 370 at target 380. In one aspect, fold mirrors 330 may be attached to rail/track 332 and moved on track 332 to either increase or decrease a path length to the far field as indicated by arrow 334. Representatively, after the beam encounters fold mirrors 330, it may be put through a zoom lens 340. The zoom lens 340, using mirror 350, may then feeds the energy into a collimator 360 that projects the energy onto a target screen 380. In one aspect, the purpose of zoom lens 340 is to vary the focal length at the collimator focus. When the focal length changes, the size of the far-field pattern 370 changes, thus allowing the system to replicate a far-field pattern 370 at different ranges.

Figure 5:
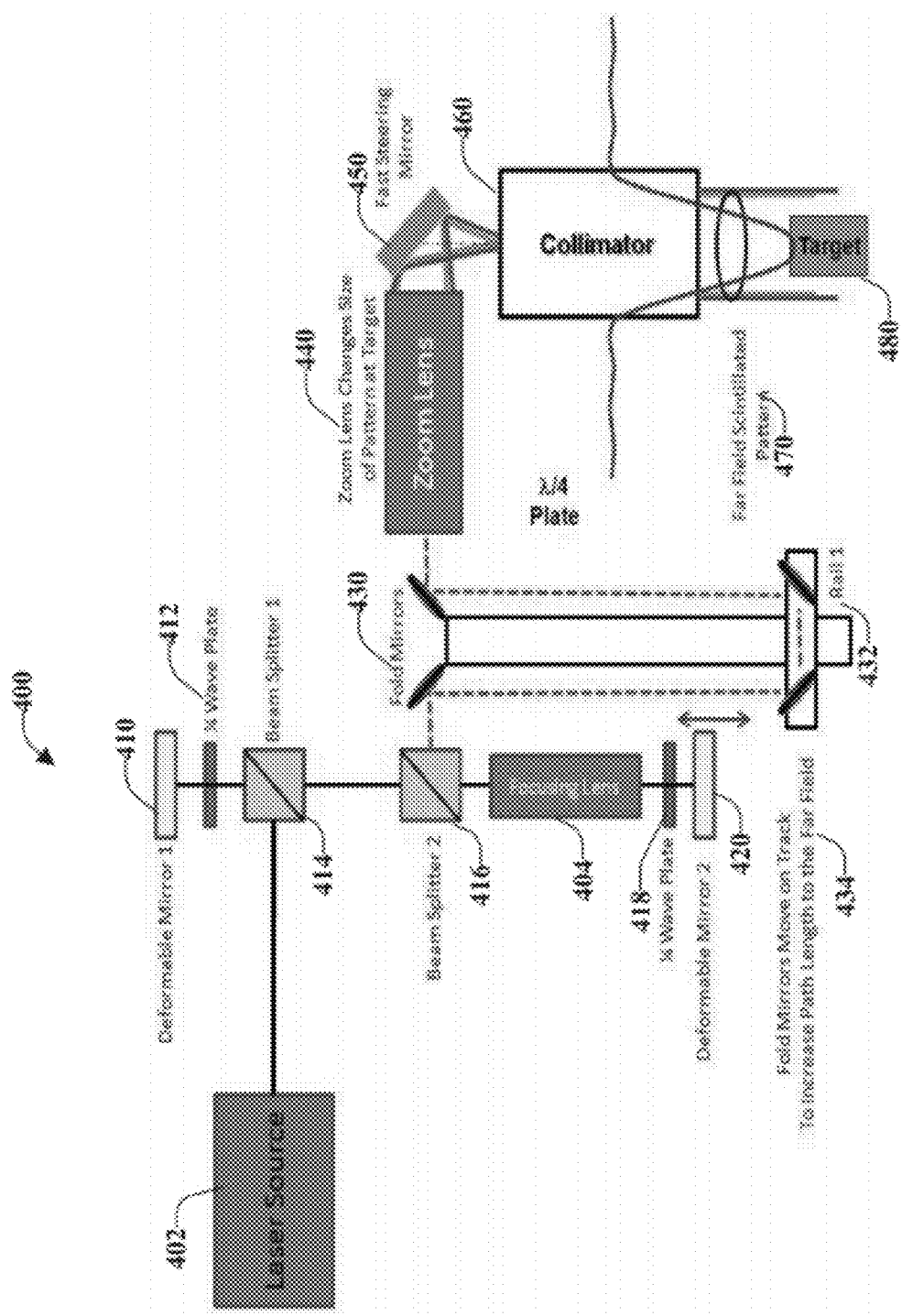
FIG. 5 is a block diagram illustrating an example of a scintillation generator for simulation of aero-optical and atmospheric turbulence according to one aspect of the subject disclosure.

FIG. 5 is a block diagram illustrating a scintillation generator 400 for simulation of aero-optical and atmospheric turbulence according to one aspect of the subject disclosure. Representatively, scintillation generator 400 may use a focusing (Fourier) lens 404 that focuses the source laser beam 402 onto a first deformable mirrors (DM-1) 410. DM-1 410 may be located at the near field of laser source 402, where the source laser beam 402 is collimated. In one aspect, DM-1 410 may introduce phase aberration to the wave-front, which may be referred to herein as near-field aberrations. In one aspect, movement (actuation) of DM-1 410 is controlled to simulate propagation of a reflected laser beam through near-field aero-optical disturbance. Representatively, the source energy reflecting from the DM-1 410 may be focused by a Fourier lens onto a second deformable mirrors (DM-2) 420 to form a near-field laser beam.

In one aspect, DM-2 420 may introduce amplitude aberrations to the wave-front at the far-field, which may be referred to herein as far-field aberrations. In one aspect, movement (actuation) of DM-2 420 is controlled to induce amplitude fluctuations onto the reflected near-field laser beam to simulate propagation of the reflected near-field laser beam through far-field atmospheric turbulence. After reflecting off of DM-2 420, the energy is then re-collimated by traveling through a collimating lens 406 (FIG. 6). In one aspect, collimating lens 406 is a second Fourier lens that has been reversed. In one aspect, an optional bank of fold mirrors 430 can be used to bring the energy to the far-field. In an alternative aspect, fold mirrors 430 could be bypassed and the resulting, aberrated near-field pattern could be used as a representation of a smaller section of a far-field pattern.

Representatively, scintillation generator 400 may utilizes polarizing first and second beam splitters (414 and 416) in conjunction with quarter (¼) wave plates (412 and 418) for allowing the incident energy to strike DM-1 410 and DM-2 420 at normal incidence angle. This introduces the least amount of residual WFE replication as there is no tip/tilt to DM-1 410 or DM-2 420 that would cause the beam spot to spread. Some experimental setups, however, cannot use beam splitters, such as scintillation generator 490 of FIG. 6, which is shown without the use of beam splitters 414 and 416. In one aspect, DM-1 310 and DM-2 320 may be tilted to an optical axis by the minimum amount of angle needed for the beam to physically clear other optical elements on the optics bench (for example a nominal 5°).

As further shown in FIG. 5, fold mirrors 430 (430-1 to 430-6 FIG. 6) are used on order to increase the optical path length in order to achieve a far-field pattern 470 at target 480. In one aspect, fold mirrors 430 may be attached to rail/track 432 and moved on track 432 to either increase or decrease a path length to the far field as indicated by arrow 434. Representatively, after the beam encounters fold mirrors 430, it may be put through a zoom lens 440. The zoom lens 440, using mirror 450, may then feed the energy into a collimator 460 that projects the energy onto a target screen 480. In one aspect, the purpose of zoom lens 440 is to vary the focal length at the collimator focus. When the focal length changes, the size of the far-field pattern 470 changes, thus allowing the system to replicate a far-field pattern 470 at different ranges.

Accordingly, aspects of the subject disclosure enable the simulation of laser beam propagation through for example, near field aero-optical turbulence as well as far field atmospheric turbulence within a laboratory environment, as shown, for example, with reference to FIGS. 3-6. In one aspect, DM-1 includes a 50 mm faceplate with 7×7 actuators. In one aspect DM-2 includes an 8 mm faceplate with 11×11 actuators. According to such an embodiment, a 25 mm diameter collimated laser beam may be used as a source laser beam 302/402 to illuminate DM-1 310/410. In one aspect, actuation of DM-1 310/410 and DM-2 320/420 may be based on wind tunnel data and CFD predictions. For example, wind tunnel data and CFD predictions may be converted into voltage signals via an algorithm that drives DM-1 310/410 and DM-2 320/420.

FIG. 7 is a diagram illustrating wave-front error (WFE) 500 generated by a first deformable mirror according to one aspect of the subject disclosure. For example, as shown in FIG. 6, WFE 500 may be generated by actuating DM-1 410 to modulate a reflected laser beam for simulation of induced near-field aero-optical aberrations onto the reflected laser beam in response to the source laser beam 402. In one aspect the induced near-field aero-optical aberrations refer to wave-front phase errors.

FIG. 8 is a diagram illustrating an irradiance plot 510 of a laser beam generated by a second deformable mirror (DM-2 420) without actuation according to one aspect of the subject disclosure. FIGS. 9A-9F are diagrams further illustrating an irradiance plots (520-570) of laser beams generated by DM-2 420 with increased actuation according to one aspect of the subject disclosure. For example, as shown in FIG. 6, WFEs may be generated by actuating DM-2 420 to modulate a reflection of the near-field laser beam for simulation of induced turbulence and scintillation onto a far-field laser beam. In one aspect the induced turbulence and scintillation may refer to amplitude fluctuations superimposed onto the near-field beam to form a far-field scintillated pattern 470.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for simulating long-path turbulence and scintillation, the method comprising:
   controlling a first deformable mirror to modulate a first reflected laser beam reflected off of the first deformable mirror and to induce wave-front phase errors in the first reflected laser beam to simulate propagation of a laser beam through near-field aero-optical disturbance;
   focusing the first reflected laser beam onto a second deformable mirror to form a second reflected laser beam, the second deformable mirror being positioned within a near-field of the first reflected laser beam and located in a Fourier plane of the first deformable mirror; and
   controlling the second deformable mirror to modulate the second reflected laser beam to induce amplitude fluctuations in the second reflected laser beam to simulate propagation of the first reflected laser beam through far-field atmospheric turbulence.

2. The method of claim 1, wherein controlling the first deformable mirror further comprises:
   receiving wind tunnel measured data; and
   controlling actuation of the first deformable mirror in response to the wind tunnel data to induce near-field aero-optical aberrations onto the first reflected laser beam.

3. The method of claim 1, further comprising:
   illuminating the first deformable mirror with collimated light.

4. The method of claim 1, further comprising:
   adjusting an optical path length of the second reflected laser beam to achieve a pre-determined far-field pattern at a target.

5. The method of claim 1, further comprising:
   passing the second reflected laser beam through a collimator to form a far-field laser beam; and
   projecting the far-field laser beam onto a target screen using the collimator.

6. The method of claim 1, wherein controlling the second deformable mirror further comprises:
   receiving computational fluid dynamics predictions of atmosphere; and
   controlling actuation of the second deformable mirror in response to the computational fluid dynamics predictions to induce amplitude fluctuations onto the second reflected laser beam to form a far-field laser beam.

7. The method of claim 6, further comprising:
   collimating the far-field laser beam using a reversed Fourier lens.

8. A non-transitory computer readable medium having processor-executable software instruction to perform a method for simulating of long-path turbulence and scintillation, comprising:
   illuminating a first deformable mirror using collimated light from a source laser beam;
   controlling the first deformable mirror to modulate a first reflected laser beam reflected off of the first deformable mirror and to induce near-field aero-optical aberrations in the first reflected laser beam to simulate propagation of the collimated light through near-field aero-optical disturbance;

focusing the first reflected laser beam onto a second deformable mirror to form a second reflected laser beam, the second deformable mirror being positioned within a near-field of the first reflected laser beam and located in a Fourier plane of the first deformable mirror; and controlling the second deformable mirror to modulate the second reflected laser beam to induce amplitude fluctuations in the second reflected laser beam to simulate propagation of the first reflected laser beam through far-field atmospheric turbulence.

9. The non-transitory computer readable medium of claim 8, wherein controlling the second deformable mirror further comprises:

receiving computational fluid dynamics predictions of atmosphere; and controlling actuation of the second deformable mirror in response to the computational fluid dynamics predictions to induce amplitude fluctuations superimposed onto the second reflected laser beam to form a far-field laser beam.

10. The non-transitory computer readable medium of claim 9, further comprising:

collimating the far-field laser beam using a reversed Fourier lens.

11. The non-transitory computer readable medium of claim 9, further comprising:

adjusting an optical path length of the far-field laser beam to achieve a pre-determined far-field pattern at a target.

12. The non-transitory computer readable medium of claim 11, further comprising:

projecting the far-field laser beam onto a target screen using a collimator.

13. The non-transitory computer readable medium of claim 8, wherein actuating the first deformable mirror further comprises:

receiving wind tunnel measured data; and controlling actuation of the first deformable mirror in response to the wind tunnel data to induce wave-front phase errors onto the first reflected laser beam.

14. A system for simulating of long-path turbulence and scintillation within a laboratory, comprising:

a source laser beam;

a first deformable mirror operable to actuate for modulation of a first reflected laser beam reflected off of the first deformable mirror and to induce wave-front phase errors in the first reflected laser beam to simulate propagation of the source laser beam through near-field aero-optical disturbance;

a lens operable to focus the first reflected laser beam onto a second deformable mirror to form a second reflected laser beam, the second deformable mirror being positioned within a near-field of the first reflected laser beam;

the second deformable mirror operable to reflect the first reflected laser beam and to induce amplitude fluctuations in the second reflected laser beam to simulate propagation of the first reflected laser beam through far-field atmospheric turbulence; and a controller operable to control actuation of the first and second deformable mirrors, wherein the second deformable mirror is in a Fourier plane of the first deformable mirror.

15. The system of claim 14, wherein the controller is further operable to control actuation of the second deformable mirror in response to computational fluid dynamics predictions of atmosphere to induce amplitude fluctuations onto the second reflected laser beam to form a far-field laser beam.

16. The system of claim 14, wherein the controller is further operable to control actuation of the first deformable mirror in response to wind tunnel data to induce near-field aero-optical disturbance onto the first reflected laser beam.

17. The system of claim 15, further comprising a collimator operable to project the far-field laser beam onto a target screen, the collimator positioned in an optical path to the target screen.

18. The system of claim 15, further comprising a plurality of adjustable fold mirrors operable to adjust an optical path length of the far-field laser beam to achieve a pre-determined far-field pattern at a target.

19. The system of claim 18, a zoom lens positioned between the fold mirrors and the target, the zoom lens operable to adjust a size of the pre-determined far-field pattern at the target.

* * * * *